United States Patent [19]

Boudreau

[11] 4,134,170
[45] Jan. 16, 1979

[54] CARTRIDGE TAPE CLEANING DEVICE

[76] Inventor: Normand Boudreau, 462 Mercier St., St. John, Quebec, Canada

[21] Appl. No.: 899,875

[22] Filed: Apr. 24, 1978

[51] Int. Cl.² .............................................. B08B 11/02
[52] U.S. Cl. ..................................... 15/97 R; 15/100; 15/210 R
[58] Field of Search ................. 15/97 R, 100, 102, 77, 15/210

[56] References Cited

U.S. PATENT DOCUMENTS

| 1,401,013 | 12/1921 | Teltel | 15/100 |
| 3,189,929 | 6/1965 | Koppehele | 15/100 X |

*Primary Examiner*—Edward L. Roberts

[57] ABSTRACT

A device to clean the tape of an eight-track cartridge to avoid slippage thereof and thus extend the useful life of such cartridge. This cartridge tape cleaning device includes a casing made of a pair of shallow box sections hinged together in clamshell fashion, each forming a cartridge holding compartment, and having in one of them a pair of wiping pads which are removable and adjustable relative to each other. This casing is portable and adapted to carry a tape cartridge therein, the wiping pads extend transversely of the shallow box sections and the latter are formed with a pair of notches in a lateral wall thereof defining with the wiping pads a path for the tape which loops externally of the casing.

4 Claims, 3 Drawing Figures

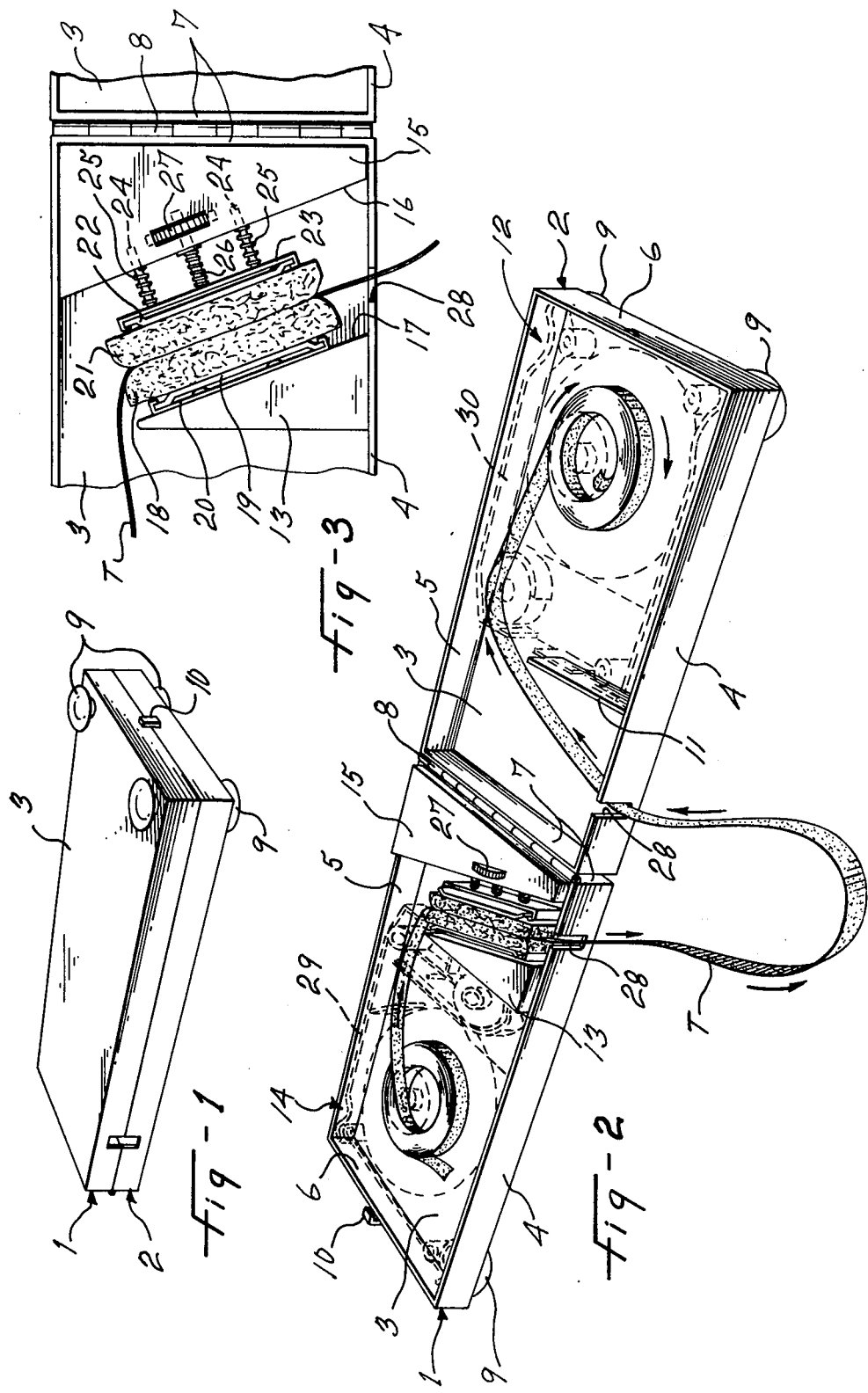

CARTRIDGE TAPE CLEANING DEVICE

This invention relates to the cleaning of tapes and, more particularly, to a device of the type adapted to clean or wipe the eight-track cartridge tapes.

The eight-track cartridge tapes have become very popular but their useful life has appeared limited due to slippage of the tape relative to the driving capstan. It has been noted that this tape slippage occurs on used tapes due to the accumulation of detached particles or dust on the tapes and on the corresponding idler rollers of the cartridges. It has also been noted that the eight-track cartridges, even when new, are wound too tight and there results malfunctioning or slippage of the cartridge tape. This relatively tight winding apparently results from machine winding under tension. This other slippage is due to the fact that the tape is unwound from the center of the roll and thus cannot tolerate much tightness in the winding.

It is a general object of the present invention to provide a cartridge tape cleaning device to extend the life of cartridge tapes by wiping the latter to prevent slippage thereof.

It is another general object of the present invention to provide a cartridge tape cleaning device which rewinds the cartridge with a minimum of tension to facilitate the operation thereof in its cartridge.

It is a further object of the present invention to provide a cartridge tape cleaning device which forms a portable case to hold the tape cartridge, and which does not include any shaft or spindle and thus avoids the problem of matching sizes and of releasably and suitably securing the roll of tape on said shaft or spindle.

It is another object of the present invention to provide a cartridge tape cleaning device which includes removable and relatively adjustable cleaning pads and wherein the latter extend transversely relative to the casing and are associated with notches in a lateral wall of the casing to form a path for the tape which loops externally of the casing for easy grasping and pulling of the tape.

The above and other objects and advantages of the present invention will be better understood with reference to the following detailed description of a preferred embodiment thereof which is illustrated, by way of example, in the accompanying drawings, in which:

FIG. 1 is a perspective view of a cartridge tape cleaning device according to the present invention and shown in closed position;

FIG. 2 is a perspective view of the cartridge tape cleaning device of FIG. 1, but this time shown in open position; and FIG. 3 is a detailed top view of the tape wiping pads, also shown in FIG. 2.

The illustrated cartridge tape cleaning device includes a casing formed of a pair of shallow box sections 1 and 2, each having a bottom 3 and a peripheral wall extending around the corresponding bottom and forming a pair of opposite end walls 6 and 7. A piano type hinge 8 pivotally connects the adjoining end walls 7, such that the shallow box sections 1 and 2 are arranged in clamshell closing relationship.

A pair of suction cups 9 are fixed to each bottom 3 adjacent the corresponding end wall 6, whereby the casing may be adhered in fixed open position on a supporting surface, as shown in FIG. 2. A catch 10 is secured to the end walls 6 and adapted to releasably lock the casing in closed position, as shown in FIG. 1.

A partition 11 extends transversely in the shallow box section 2 and is fixed in the latter intermediate the opposite end walls 6 and 7 thereof and thus forms a tape cartridge holding compartment 12 extending flat against the corresponding bottom and adjacent the end wall 6. Similarly, a triangular block 13 extends transversely in the shallow box section 1 and is fixed in the latter intermediate the opposite end walls 6 and 7 thereof and thus forms a tape cartridge holding compartment 14 extending flat against the corresponding bottom and adjacent the end wall 6.

A tape wiping device is mounted in the shallow box section 1 on the opposite side of the partition 13 relative to the tape cartridge holding compartment 14. This tape wiping device includes a hollow body 15 having an inner face 16 arranged parallel with a face 17 of the partition block 13.

A first wiping pad 18, of any appropriate material, is fixed to a carrier plate 19 which removably engages in a channel-shape baseplate 20 fixedly secured to the block 13. Similarly, a second wiping pad 21 is fixed to a carrier plate 22 which removably engages in a channel-shape baseplate 23. The latter is fixed to a pair of guide pins 24 which slide axially in and out of the body 15 and springs 25 are engaged around these guide pins and bias the second wiping pad 21 toward engagement with the first.

A screw 26 is secured to the baseplate 23 and is rotatable through the head 27 thereof to adjust the wiping pad 21 toward and away relative to the first wiping pad 18.

A notch 28 is formed through each side wall 4 for the passage of the tape T therethrough. As shown in the drawing, the wiping pads extend transversely of the shallow box sections and toward the associated aperture 28 and form with the apertures 28 a tape path which loops externally of the casing.

In practice, the tape cartridge, the tape of which is to be cleaned, is opened at the central joint; the tape is cut; and the cartridge halves are placed in the tape cartridge holding compartments, such that the unwinding half 29 is in the compartment 14, while the winding half 30 is in the compartment 12.

The tape T is pulled out of the unwinding cartridge half 29 from around the idler thereof and the tape wiping pads extend diagonally from this idler to the corresponding aperture 28 to prevent kinks or catching of the tape. The loop of tape T outside the casing serves to pull out the tape to unwind it. The spool in the box section 2 is rotated by hand to rewind the tape thereon without exerting tension on the tape.

What I claim is:

1. A cartridge tape cleaning device comprising a casing including a pair of complementary shallow box sections and a hinge connection, each of the shallow box sections including a bottom and a peripheral wall extending around the corresponding bottom and forming a pair of opposite side walls and a pair of opposite end walls with the hinge connection pivotally connecting adjoining end walls of the shallow box sections with the latter arranged in clamshell closing relationship, a partition member secured in each shallow box section intermediate the opposite end walls thereof and forming in the corresponding shallow box section a tape cartridge holding compartment extending flat against the corresponding bottom and adjacent the other of the corresponding end walls, a tape wiping device mounted in one of the shallow box sections externally of the tape cartridge holding compartment thereof and extending within the confines of the casing upon closure thereof, said shallow box sections each having an aperture through one side wall thereof for the passage of the tape therethrough and said tape wiping device includes a pair of wiping pads extending transversely of the shallow box sections and toward the aperture of the corresponding shallow box section and forming with said apertures a tape path which loops externally of the casing.

2. A cartridge tape cleaning device as defined in claim 1, wherein said tape wiping pads are removably mounted in said one shallow box section, and an adjustable mounting is connected to one of the tape wiping pads and arranged to adjust the same toward and away relative to the other tape wiping pad.

3. A cartridge tape cleaning device as defined in claim 2, wherein the tape is pulled out of one tape cartridge around one idler thereof and the tape wiping pads extend diagonally in substantial alignment with the aperture of said one box section and with said one idler.

4. A cartridge tape cleaning device as defined in claim 3, wherein said adjustable mounting device includes an adjustment screw connected endwise to said one tape wiping pad, an actuation knob secured to said screw and adapted to displace the latter toward and away relative to the other tape wiping pad, a pair of guide pins connected to said tape wiping pad and extending parallel to the adjustment screw, and a spring coiled around each of the guide pins and operatively biasing said one tape wiping pad toward engagement with the other pad.

* * * * *